2,891,842
CATALYTIC PROCESS FOR PREPARING CUPROUS OXIDE FROM MIXED COPPER OXIDES

Joseph E. Drapeau, Jr., Hammond, and Paul D. Johnson, Gary, Ind., assignors to The Glidden Company, Cleveland, Ohio, a corporation of Ohio No Drawing. Original application March 19, 1953, Serial No. 343,514. Divided and this application April 10, 1956, Serial No. 577,200

8 Claims. (Cl. 23—147)

This invention relates to a novel catalytic process for converting mixed copper oxides into cuprous oxide.

This application is a division of our copending application Serial No. 343,514, filed March 19, 1953, now Patent No. 2,817,579.

Mixtures containing cuprous oxide and cupric oxide with or without metallic copper are available commercially as the end product of a variety of processes. For instance, the well known copper ammonium carbonate leaching process for the extraction of copper gives as its final product a mixture of copper oxides. Furthermore, the roasting of metallic copper such as scrap copper usually produces a mixture of copper oxides, particularly when metallic copper remains in the mass as the conclusion of the roasting. In such a process, the roasted mass is tumbled or otherwise abraded to remove the oxides from the metallic copper, after which the oxides are separated from the metallic copper, and the latter is recycled for additional roasting. See U.S. Patent No. 2,304,078, to Drapeau et al.

Mixtures of oxides such as result from the above and other processes can be used in the present process for the preparation of cuprous oxide. Moreover, cupric oxide alone can also be used either by first subjecting it to mild reduction so as to prepare a mixture of metallic copper with cuprous and cupric oxides, or by mixing it directly with metallic copper, or both.

Suitable mixtures such as described above are hereinafter referred to as "oxidic copper mixtures."

As noted above, the present invention is concerned with the conversion of such oxidic copper mixtures into cuprous oxide, and is based on our discovery that such conversion can be accomplished on a commercial basis by the use of aqueous ammonia as a catalyst therefor when the total reducing power of the mixture is between about 95% and 105%. The cuprous oxide so prepared can be subjected to an after-treatment described and claimed in application Serial No. 343,514, supra, to change its color from a muddy brown to a clean red.

Accordingly, it is an object of this invention to provide a novel commercial process for preparing cuprous oxide from oxidic copper mixtures having a total reducing power around 95% to 105%.

It is a further object to provide a novel catalytic process for converting oxidic copper mixtures into cuprous oxide having a purity of 95% or higher.

Still a further object is to provide a novel process for increasing the cuprous oxide content of an oxidic copper mixture.

These and other objects will be apparent from the following description of the invention.

We have found that when an oxidic copper mixture has a total reducing power between about 95% and 105% that of $Cu_2O$, it can be treated with a small, catalytic amount of aqueous ammonia under substantially non-oxidizing conditions at temperatures between about 40° F. and 150° F. for a suitable period of time to cause the mixture to be converted to cuprous oxide of at least sufficient purity to meet current commercial specifications. Such specifications usually correspond to U.S. Navy Specification MIL–C–15169, and call for a minimum of 95% cuprous oxide on Grade II material, 97% cuprous oxide on Grade I material, and a minimum total reducing power of 97% on either grade.

The amounts of ammonia ($NH_3$) used in such treatment can be from about 0.5% to 5.0% or more by weight on the oxidic copper mixture, but since the effect is catalytic in nature there is little need to use for than will effect the desired conversion within the desired period of time. We prefer to use amounts of ammonia corresponding to between about ½% and 3% of $NH_3$ by weight on the oxidic copper mixture being treated.

The foregoing amounts of ammonia can be dissolved in any desired amount of water to give a solution ranging from very dilute up to saturation. However, since all of the treated mass must usually be dried prior to shipping, we prefer to use as little water as is consistent with good wetting of the charge and with an economical over-all treatment cost, such as an amount between about 15% and 30% by weight of the mixture being treated.

We have found that mixtures containing up to 11% free copper can be treated commercially by our process without requiring an unusually prolonged treating time. If treating time is not a factor to be considered, then mixtures of cupric oxide and metallic copper which have a total reducing power outside the range of about 95% and 105% can be converted by our process to specification-grade cuprous oxide. It is more practical cost-wise, of course, to thermally reduce the cupric oxide to a mixture of $Cu_2O$ and $CuO$, with or without metallic copper, since less added metallic copper is then needed to bring the total reducing power up to the range stated above.

Without wishing to be bound by the theory here expressed, we believe that the reactions which are promoted by the aqueous ammonia catalytic treatment are represented by the following equations:

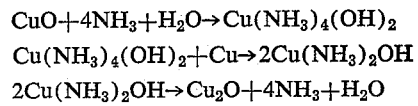

The cyclic nature of the reactions is evident from these equations. It is also evident that when the mechanism of the reactions is disregarded, the ultimate reaction promoted by the aqueous ammonia is:

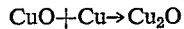

Accordingly, it will be clear that the starting mixture should have its $CuO$ content and its metallic copper content substantially in balance on a stoichiometric basis; this, of course, is the same thing as calling for a total reducing power around 100%. When the total reducing power is above 100%, then metallic copper is in stoichiometric excess over available cupric oxide. When the total reducing power is below 100%, then cupric oxide is in stoichiometric excess over available metallic copper. Since some slight amount of oxidation of $Cu_2O$ by air may occur even in a closed container during the course of the treatment, additional small quantities of $CuO$ are formed and either add to the excess $CuO$ when the initial total reducing power was originally below 100%, or consume some of the metallic copper which would otherwise remain when the initial total reducing power was originally over 100%. Those skilled in the art will understand that such adventitious results can be suitably offset by minimizing oxidation by the air and by initially adjusting the total reducing power of the charge.

The following example illustrates the above-described catalytic treatment:

*Example 1*

An oxidic copper mixture having a total reducing power below 70% and containing practically no free copper was reduced by heating in a furnace having a gaseous reducing atmosphere until the total reducing power had reached approximately 100%. The reduced mass, upon chemical analysis, was found to consist of:

| | Percent |
|---|---|
| Free copper | 9.06 |
| Cuprous oxide | 81.06 |
| Cupric oxide | 9.88 |
| | 100.00 |

Sixteen thousand pounds of the reduced mass was introduced into a substantially closed but vented steel drum capable of being slowly rotated about a horizontal axis, and of being heated externally when desired. Four hundred gallons of water and 110 gallons of aqua ammonia (29.4% $NH_3$) were added. The drum was closed to prevent oxidation of the wet charge, and was slowly rotated for 24 hours, no heat being applied during this period. At the end of the 24 hour period, enough heat was applied to the drum to cause water and ammonia to be evaporated and exhausted at a convenient rate through the vent. The drum was rotated under these conditions until the contents had been dried, which required about 16 hours. The resulting dry material had a total reducing power of 100%, and had the following chemical analysis:

| | Percent |
|---|---|
| Free copper | 1.31 |
| Cuprous oxide | 97.03 |
| Cupric oxide | 1.66 |
| | 100.00 |

The color of the treated product was somewhat brownish, but was better than that of the original mixed oxides.

The amount of $NH_3$ added in the above treatment amounted to about 1.53% by weight on the partially reduced mass.

The ammonia driven off during the drying treatment can be recovered for recycling to subsequent batches.

While the total reducing power of the original oxidic copper mixture used in Example 1 was adjusted to 100% by a gaseous reduction treatment, it should be understood that this adjustment of reducing power can be effected just as well by adding metallic copper powder to the original mixture. The following example illustrates this manner of adjusting the total reducing power.

*Example 2*

A charge of impure cuprous oxide in the amount of 15,191 pounds was introduced into a drum of the type described in Example 1. The charge had a total reducing power of 94.30% and analyzed:

| | Percent |
|---|---|
| Free copper | 1.93 |
| Cuprous oxide | 89.95 |
| Cupric oxide | 8.12 |
| | 100.00 |

Fine copper powder in the amount of 893 pounds was added to and mixed with the charge in the drum, thereby bringing the total reducing power of the resulting mixture to 101.53%. Aqua ammonia (29.4% $NH_3$) and water were added to the mixture in the amounts of 110 gallons and 400 gallons respectively, and the closed drum was rotated for 40 hours. A sample of the material was then dried out by heating and was found then to have a brown color. The dry material had a total reducing power of 99.0% and analyzed:

| | Percent |
|---|---|
| Cuprous oxide | 95.90 |
| Free copper | 1.38 |
| Cupric oxide | 2.72 |
| | 100.00 |

It is well known in the cuprous oxide and copper pigment art that excessive dry milling will convert a bright colored cuprous oxide to a dark colored material. To bring about a good color, all the essential dry milling should be done prior to the processing treatment described hereinabove.

Having described our invention, what we claim is:

1. A catalytic process for converting to cuprous oxide a comminuted oxidic copper mass containing oxidic copper compounds selected from the group consisting of cupric oxide and mixtures of cupric and cuprous oxides which comprises the steps of: contacting said comminuted mass with metallic copper so proportioned in accordance with the equation:

$$CuO + Cu \rightarrow Cu_2O$$

that sufficient metallic copper is available to convert substantially all of the cupric oxide to cuprous oxide; wetting said comminuted mass with aqueous ammonia in amounts providing between about 0.5 and about 5% of $NH_3$ by weight on the comminuted mass being wetted and thereafter continuing to maintain contact between cupric oxide of said mass and metallic copper at temperatures between about 40° F. and 150° F. and under substantially non-oxidizing conditions until substantially all of the cupric oxide of said mass has been converted to cuprous oxide; and then drying the so-treated mass of solids by driving off water and ammonia under conditions conducive to retention of the copper of said cuprous oxide in its monovalent state.

2. The process as claimed in claim 1 wherein  metallic copper amounts to as much as 11% by weight on said comminuted mass and wherein said aqueous ammonia provides between about 15% and 30% of water by weight on said comminuted mass.

3. The process as claimed in claim 2 wherein aqueous ammonia provides between about 0.5% and 3% of $NH_3$ by weight.

4. A catalytic process for treating a comminuted oxidic copper mass containing oxidic copper compounds selected from the group consisting of cupric oxide and mixtures of cupric and cuprous oxides to increase its cuprous oxide content, which comprises: treating said oxidic copper mass under substantially non-oxidizing conditions at temperatures between about 40° F. and 150° F. and in the presence of metallic copper with aqueous ammonia as the sole catalyst in amounts providing between about 0.5% and about 5% of $NH_3$ and between about 15% and 30% of water, by weight on the solids being so treated, until substantially all of the available metallic copper has been consumed in reducing cupric oxide of said mass to cuprous oxide; and thereafter drying the so-treated mass of solids under conditions conducive to retention of the copper of the cuprous oxide in its monovalent state while driving off water and ammonia.

5. The process as claimed in claim 4 wherein the metallic copper is present in an amount up to about 11% by weight and is substantially equivalent stoichiometrically to the amount of cupric oxide contained in the oxide copper mass, whereby the mass of solids obtained at the conclusion of the treatment is substantially all cuprous oxide.

6. The process as claimed in claim 5 wherein the amount of $NH_3$ is between about ½% and 3% by weight on the solids being treated.

7. The process as claimed in claim 4 wherein the amount of $NH_3$ is between about ½% and 3% by weight on the solids being treated.

8. A catalytic process for treating comminuted cupric oxide to convert at least a part thereof to cuprous oxide, which comprises: subjecting said cupric oxide under substantially non-oxidizing conditions at temperatures between about 40° F. and 150° F. and in the presence of metallic copper to treatment with aqueous ammonia as the sole catalyst in amounts providing between about 0.5% and about 5% of $NH_3$, by weight on the solids being so treated, until substantially all of the available metallic copper has been consumed in reducing said cupric oxide to cuprous oxide; and thereafter drying the so-treated mass of solids under conditions conducive to retention of the copper of the cuprous oxide in its monovalent state while driving off water and ammonia.

References Cited in the file of this patent

UNITED STATES PATENTS

| | | |
|---|---|---|
| 2,474,497 | Rowe | June 28, 1949 |
| 2,474,533 | Klein | June 28, 1949 |
| 2,758,014 | Drapeau et al. | Aug. 7, 1956 |

OTHER REFERENCES

Mellor: "Comprehensive Treatise of Inorganic and Theoretical Chemistry," Longmans, Green & Co., New York, 1923, vol. 3, pages 118, 138.